US010279299B2

(12) United States Patent
Keshavan Raghavan

(10) Patent No.: US 10,279,299 B2
(45) Date of Patent: May 7, 2019

(54) AIR COMPRESSOR DRYER FILTER

(71) Applicant: Ingersoll-Rand Company, Davidson, NC (US)

(72) Inventor: Mahesh Kumar Keshavan Raghavan, Ahmedabad (IN)

(73) Assignee: Ingersoll-Rand Company, Davidson, NC (US)

( * ) Notice: Subject to any disclaimer, the term of this patent is extended or adjusted under 35 U.S.C. 154(b) by 203 days.

(21) Appl. No.: 15/340,454

(22) Filed: Nov. 1, 2016

(65) Prior Publication Data
US 2018/0117516 A1    May 3, 2018

(51) Int. Cl.
*B01D 46/00* (2006.01)
*B01D 46/24* (2006.01)
*B01D 46/42* (2006.01)
*B01D 41/04* (2006.01)

(52) U.S. Cl.
CPC ......... *B01D 46/2403* (2013.01); *B01D 41/04* (2013.01); *B01D 46/00* (2013.01); *B01D 46/0005* (2013.01); *B01D 46/4227* (2013.01); *B01D 2275/201* (2013.01)

(58) Field of Classification Search
CPC ............ B01D 46/2403; B01D 46/0012; B01D 46/4227; B01D 41/04; B01D 53/265; B01D 2275/201
See application file for complete search history.

(56) References Cited

U.S. PATENT DOCUMENTS

| 744,060 | A | * | 11/1903 | Frye | B01D 29/085 |
| | | | | | 210/239 |
| 3,896,633 | A | | 7/1975 | Moore | |
| 4,311,439 | A | | 1/1982 | Stofen | |
| 4,505,128 | A | * | 3/1985 | Miller | A61M 16/10 |
| | | | | | 62/272 |
| 5,428,963 | A | | 7/1995 | Korycki et al. | |
| 5,699,673 | A | * | 12/1997 | Hoshino | B01D 53/265 |
| | | | | | 62/272 |
| 5,888,260 | A | * | 3/1999 | Sica | B01D 46/0012 |
| | | | | | 55/331 |
| 6,485,535 | B1 | | 11/2002 | Linnersten et al. | |
| 6,691,428 | B1 | | 2/2004 | Zarif | |
| 7,008,472 | B2 | | 3/2006 | Fornof et al. | |
| 7,625,437 | B2 | | 12/2009 | Heer | |
| 8,226,739 | B1 | | 7/2012 | McNatt et al. | |
| 8,443,868 | B2 | | 5/2013 | Barnwell | |
| 9,021,817 | B2 | | 5/2015 | Hoerner et al. | |
| 2010/0155345 | A1 | * | 6/2010 | Al-Sannaa | B01D 35/02 |
| | | | | | 210/806 |
| 2011/0265438 | A1 | * | 11/2011 | Ryan | B01D 29/35 |
| | | | | | 55/503 |

* cited by examiner

*Primary Examiner* — Robert Clemente
(74) *Attorney, Agent, or Firm* — Taft Stettinius & Hollister LLP

(57)    ABSTRACT

An air compressor system having a refrigerated dryer and a form of a filter is used between a compressor of the air compressor system and the refrigerated dryer. The filter can include a conical shape such as frustoconical, and includes an outer retainer having a plurality of openings and an inner mesh filter. The retainer and mesh filter can be made out of metal. An end cap and a flange can close off both ends of the conical shape, and a handle can extend from a flange to aid in ease of handling. The components extending between the ends (i.e. between the end cap and flange) may only include the retainer and the mesh filter.

18 Claims, 3 Drawing Sheets

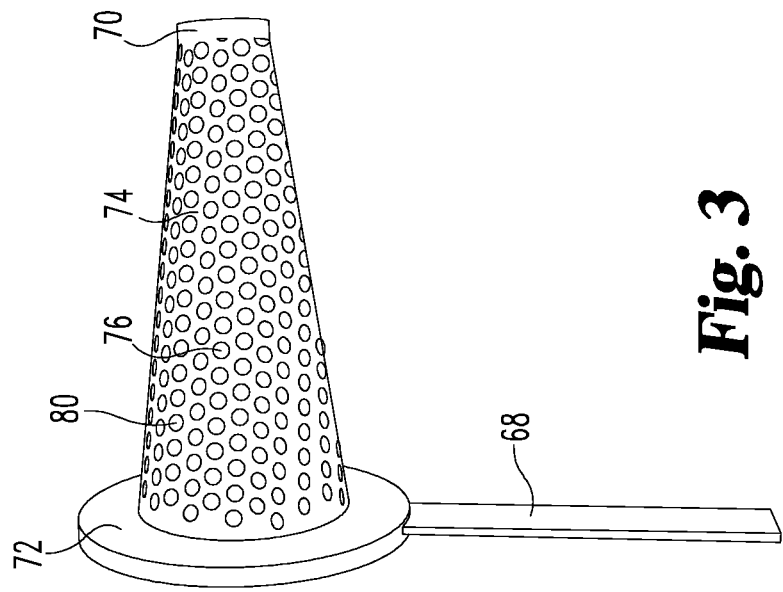
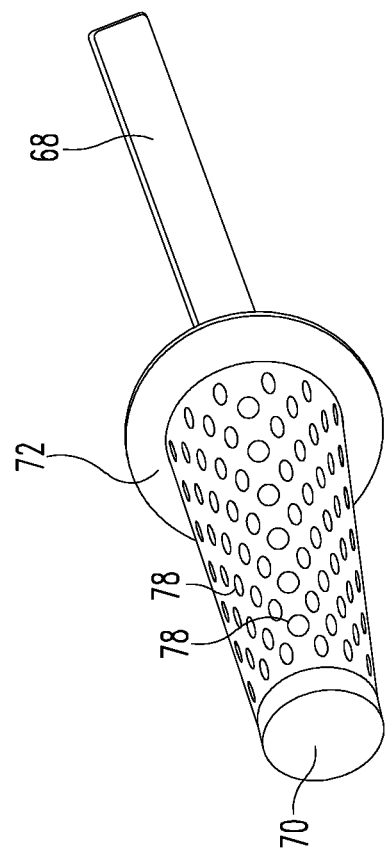
*Fig. 3*
*Fig. 2*

AIR COMPRESSOR DRYER FILTER

TECHNICAL FIELD

The present invention generally relates to air compressor filters, and more particularly, but not exclusively, to filters used immediately upstream of refrigerated dryers used with air compressors.

BACKGROUND

Providing effective filtering for air compressor systems remains an area of interest. Some existing systems have various shortcomings relative to certain applications. Accordingly, there remains a need for further contributions in this area of technology.

SUMMARY

One embodiment of the present invention is a unique air compressor dryer filter. Other embodiments include apparatuses, systems, devices, hardware, methods, and combinations for filtering air incoming to a heat exchanger used with an air compressor refrigerated dryer. Further embodiments, forms, features, aspects, benefits, and advantages of the present application shall become apparent from the description and figures provided herewith.

BRIEF DESCRIPTION OF THE FIGURES

FIG. 2 depicts an embodiment of an air compressor filter.

FIG. 3 depicts an embodiment of an air compressor filter.

DETAILED DESCRIPTION OF THE ILLUSTRATIVE EMBODIMENTS

Figure 1:
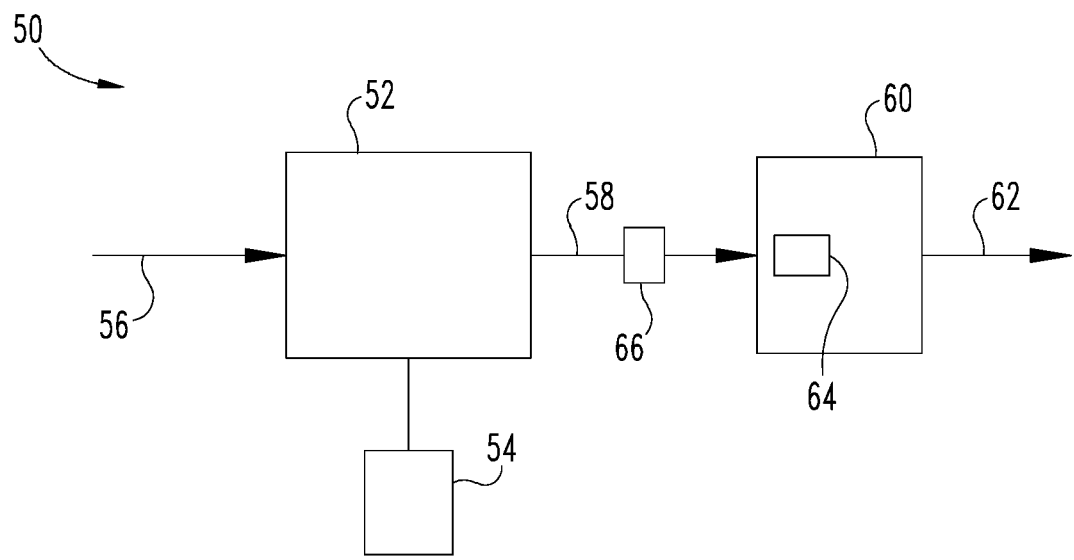
FIG. 1 depicts an embodiment of an air compressor system having a refrigerated dryer and a filter used between the compressor and dryer.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a compressor system 50 is shown which includes a compressor 52 driven by a motor 54. The compressor 52 can take on any form of compressor including screw compressors, centrifugal compressors, etc. and can be driven by any variety of motors 54, with an electric motor being just one non-limiting example. A flow of compressible fluid 56, such as but not limited to air, is received by the compressor 52 and compressed to form a compressed fluid flow 58. The compressed fluid flow 58 is routed to a dryer 60 which is used to remove vapor, such as water vapor, from the compressed fluid flow 58. The dryer 60 in turn provides a flow of relatively dry compressed fluid 62.

The dryer 60 can take on a variety of forms including a refrigerated dryer having refrigeration equipment that assists in removing unwanted vapor, such as water vapor, from the compressed airflow 58. In one nonlimiting embodiment the dryer 60 includes a heat exchanger 64 maintained at a relatively low temperature to assist in condensing water vapor from the compressed airflow 58. The heat exchanger 64 can be, or can be thermally coupled with, an evaporator of the refrigeration system of the dryer 60. The heat exchanger 64 can take on a variety of forms and in many embodiments can include a thin wall construction that may or may not include thermal fins.

A filter 66 can be disposed in the line that carries compressed airflow 58 from the compressor 54 to the dryer 60. Other equipment can also be disposed between the compressor 52 and dryer 54. The filter 66 is described more fully below and is structured to capture solid particulate material in the compressed airflow 58, such as such as rust particles, weld debris, etc. Though some moisture can condense on the filter 66, the size of the openings and configuration of the filter 66 are structured herein to substantially permit vapor and liquid mist to pass while being small enough to capture solid particulate matter.

Turning now to FIGS. 2 and 3, one embodiment of the filter 66 is disclosed which includes a handle 68, end cap 70, flange 72, retainer 74, and mesh filter 76 (located inside of retainer 74 and visible through retainer openings). The handle 68 can be affixed to the filter 66 and in the illustrated embodiment is affixed to the flange 72 (either through mechanical coupling or integrally formed therewith, among other possibilities). Such a handle 68 can take on an elongate form as illustrated in the figures. Other embodiments can include asymmetric extensions from the flange 72 of a size and shape to be grasped by a user when either replacing or regenerating the filter. The handle 68 can extend beyond the filter any distance sufficient to permit ease of handling.

The end cap 70 and flange can be used to seal off the filter 66 such that passing fluid, such as air, must traverse through the openings in the retainer 74 and the mesh filter 76 located within it. The end cap 70 can be made of any suitable material and can be affixed to one or both of the retainer 74 and mesh filter 76, such as through any variety of techniques (e.g. mechanical, metallurgical, chemical, etc). In similar fashion, the flange 72 can be made of any suitable material and can be affixed to one or both of the retainer 74 and mesh filter 76, such as through any variety of techniques (e.g. mechanical, metallurgical, chemical, etc). In contrast with the end cap 70, however, the flange 72 includes an open interior to allow compressible fluid to pass. In one non-limiting form the open interior of the annular flange operates as an intake for a flow of compressible fluid as it move first through the openings in the mesh filter 76 and then through the openings in the retainer 74. The flange 72 can be sized radially large enough to fit between flanges of neighboring pipe conduit.

As will be appreciated by review of the illustrated embodiments, in one form the filter 66 can take on a conical shape. As used herein and unless otherwise indicated, the term conical is intended as a generic term to cover conical shapes including frustoconical or those similar to a frustum of a cone whether or not the frustum is truncated by a literal plane parallel to the base of a cone. Such conical shapes can include frustums that have a lopsided appearance in the tip of the truncated cone.

Openings in the retainer 74, and passages in the filter mesh 76 (both openings and passages of which are described more fully below), are structured to be sufficiently large enough to permit passage of large quantities of compressible gas such that the filter is suitable for use in-line with an air compressor. In embodiments herein the filter mesh 76 and the retainer 74 can be the only components formed in a layered frustoconical shape that are disposed between the ends of the filter 66.

It will be appreciated that sizing of either the openings in the retainer 74, or passages in the filter mesh too small would cause unacceptable pressure drop and possible backpressure conditions making it unsuitable for use with an air compressor. In one non-limiting example, the velocity of compressible gas across the filter 66 should be maintained between 10-15 m/s by appropriate sizing of openings and passages so that a minimum pressure drop is experiences across the filter 66.

As mentioned above, the retainer 74 has a plurality of internal passages 78 that permit compressible gas to traverse between an outer side and inner side of the frustum shaped retainer 74. In one form the retainer 74 includes a number of relatively large perforations or holes to permit passage of air to be filtered by the mesh filter 76. For ease of convenience, the retainer 74 may be referred to herein as a "retainer" or a "perforated retainer," but no limitation is intended that the openings in the retainer must necessarily be formed from a perforation process in all embodiments. The retainer 74 can provide the structural strength needed in the filter assembly to retain the conical shapes described herein. The perforations or holes 78 can be any suitable shape and size, and can take on a variety of distributions around the circumference of the retainer 74. It is contemplated that the perforated retainer 74 can include any number of individual perforations or holes that permit air to pass. The individual perforations or holes 78 can be formed using any variety of manufacturing approaches, including stamping/drilling/cutting holes into a sheet stock or casting into place in a near net shape or net shape cast body. Furthermore, the perforations or holes 78 can take any sizes, shapes, and/or configurations, including the uniformly dispersed commonly shaped circular form as depicted in the illustrated embodiment. Any of the embodiments of the perforated retainer 78 can be made of metallic material, such as stainless steel including but not limited to SS304.

The openings 78 of the retainer are sufficiently large that virtually no filtering of particulate occurs save for relatively rare occurrences of very large debris present in the conduit 82. In this way the mesh filter 76 effectively acts as the only, or substantially primary, filtering component of the filer assembly, where the perforated retainer 74 merely acts to provide support for the assembly and/or mesh filter 76. In one form the cross sectional area of any individual opening 78 in the retainer 74 is an order of magnitude larger (and in some embodiments several hundred or several thousand orders of magnitude larger) than the cross sectional area of any individual passage in the filter mesh 76. In some embodiments the cross sectional area of an individual perforation/opening 78 (or all perforations/openings 78 in other embodiments) in the retainer 74 is an order of magnitude larger (and in further embodiments several orders of magnitude) than the median cross sectional area of the passages in the filter mesh. In any of the embodiments above, the size difference can be greater than 100 orders of magnitude, and in some cases greater than 1,000 order of magnitude, and in still others 100,000 orders of magnitude. In a particular embodiment, the passages 78 can have a diameter of 0.12" (0.003048 m) and a staggered pitch of 0.18" (0.004572 m), but other sizes are contemplated herein.

The retainer 74 can be formed as a single sheet of stock material, cut to shape, and rolled into a cone-like shape. In some forms the opposite ends of the cone-like structure that are brought together to form the cone like structure can be permanently affixed to one another, but in other embodiments need not be. In some forms a seam created by bringing the opposite ends together can be bonded/welded/etc together, or can be bonded/welded/etc to filter mesh, or both. Such constructions can ensure that all flow paths through the filter assembly pass only through the perforations in the perforated retainer, and through the passages in the filter mesh, and not otherwise through any open passage caused by not fully sealing the filter assembly together.

The filter mesh 76 can include any number of individual cells or passages 80 (e.g. cell passages that are known to exist in mesh structures) and can be formed using a variety of methods. For example, the wire mesh can be formed from a plain weave manufacturing process in some embodiments, but can be made using other weaves as well including twilled weave (4-bonded), flat top screen, twilled weave (5-bonded, EGLA 5), single plain dutch weave, board mesh twilled dutch weave, dutch twilled weave, or reverse plain dutch weave, among potential others. In some respects the filter mesh 76 can be viewed as having a ligament-nodal structure which includes a number of ligaments intersecting at nodes. In some embodiments the intersections of crossing wires result in interconnections such as those than can be made by material processing (e.g. metallurgical bonding, etc). In some embodiments a mesh structure can be made by layering a first series of metallic wire on top of a second series of metallic wire where the intersections of the fine wire. In still other forms the mesh can be made by interweaving fine metallic wire together where the intersections of the fine wire constitute the nodes and the ligaments are the portions of the wires that extend between nodes. In some embodiments wire strands of material, whether woven together or layered, can be sintered together to form the mesh. The wire mesh can take on single or multi-layered configurations. Other techniques of forming the mesh include stamping/drilling/cutting holes into a sheet stock, among potential others.

The individual cells or passages 80 formed within the mesh can take on any variety of shapes including but not limited to rectangles, squares, and hexagons, among potential others. It is contemplated that the filter mesh can be a 5μ fine filter mesh in any of the various embodiments, although larger or smaller fine filter meshes can be used. For example, in other embodiments the range on the mesh can be anywhere from 40-140 microns. Wire sizes that provide for various mesh screen sizes can be from 0.01 m-0.0045 m. Examples of wire mesh can be found in the publication "Woven Wirecloth & Wire Products," by Haver Standard. Any of the embodiments of the filter mesh can be made of metallic material, such as stainless steel including but not limited to SS304. Shown immediately below is a Table of possible configurations for the mesh filter (where the nominal sieve opening can be defined as the width of a square shaped cell, where area of the cell is the square of the width):

| Sieve Designation | | Nominal Sieve Opening | | |
|---|---|---|---|---|
| Standard | Mesh | Inches | mm | Microns |
| 0.149 mm | No. 100 | 0.0059 | 0.149 | 149 |
| 0.125 mm | No. 120 | 0.0049 | 0.125 | 125 |
| 0.105 mm | No. 140 | 0.0041 | 0.105 | 105 |
| 0.088 mm | No. 170 | 0.0035 | 0.088 | 88 |
| 0.074 mm | No. 200 | 0.0029 | 0.074 | 74 |
| 0.063 mm | No. 230 | 0.0025 | 0.063 | 63 |
| 0.053 mm | No. 270 | 0.0021 | 0.053 | 53 |
| 0.044 mm | No. 325 | 0.0017 | 0.044 | 44 |

In one form the mesh filter 76 can be initially cut from a sheet stock of mesh and then rolled into a cone-like shape before or as it is assembled into the interior of the retainer. In some forms the opposite ends of the sheet-stock that are brought together to form cone-like structure can be permanently affixed to each other, and/or can be affixed to the retainer 74. In some forms a seam created by bringing the opposite ends together can be bonded/welded/etc together, or can be bonded/welded/etc to the retainer 74, or both. Such constructions can ensure that all flow paths through the filter assembly 66 pass only through the passages 78 in the perforated retainer, or through the passages in the filter mesh, and not otherwise through any open passage caused by not fully sealing the filter assembly 66 together.

One or both of the fine filter mesh 76 and the retainer 74 is of sufficient rigidity that no other support is required between the end caps. For example, the retainer 74 can provide sufficient rigidity to maintain the location of the filter mesh 76, and to provide sufficient support to maintain shape of the filter mesh 76 in the presence of pressure pulsations provided from operation of the compressor 52.

The mesh filter 76 can be fitted such that a substantial portion of its surface is in contact with an inner surface the retainer 74.

To form an assembly of parts either of the upper or lower ends of one or both of the retainer 74 and the fine mesh filter 76 can be secured with the end cap 70 or flange 72. Such a secured connection can either be a single connection point or multiple connection point, or in some cases can be sealed. The connection can be by mechanical techniques (e.g. crimping, etc), chemical (e.g. epoxy bonding, etc), or metallurgical (e.g. brazing, etc) among potential others. To provide just a few nonlimiting examples, the retainer 74 can be secured to the end cap 70 and flange 72, while the mesh filter is captured in place by the assembly but otherwise permitted to float. Some forms of the filter construction can include securing the retainer 74 to the end cap 70 and/or flange 72, and securing the filter mesh 76 to the retainer 74 but not otherwise securing the filter mesh 76 to the end cap 70 or flange 72. In embodiments herein the end cap 70 and flange 72 will be sealed against one or both of the retainer 74 and the filter mesh 76 such that air is forced to flow through the fine mesh filter 76.

The filter assembly 66 can be serviced after some amount of time in operation. For example, the filter 66 can be cleaned by backflowing air through the filter mesh 76, or by washing, among potential others. In some forms the filter 66 can be serviced by being replaced, or having the mesh filter 76 replaced.

One or both of the end cap 70 and flange 72 can be removed in some embodiments to facilitate removal of the inner mesh filter 76 for purposes of either cleaning or replacement. Not all embodiments need include removable end caps 70 or flanges 72, and additionally not all embodiments need include mesh filters 76 that can be removed from the retainer 74. In some forms the perforated retainer 74 and mesh filter 76 can be an integrated whole that is effectively permanently integrated such that the mesh filter is not capable of removal from one another without substantial damage.

Figure 4:
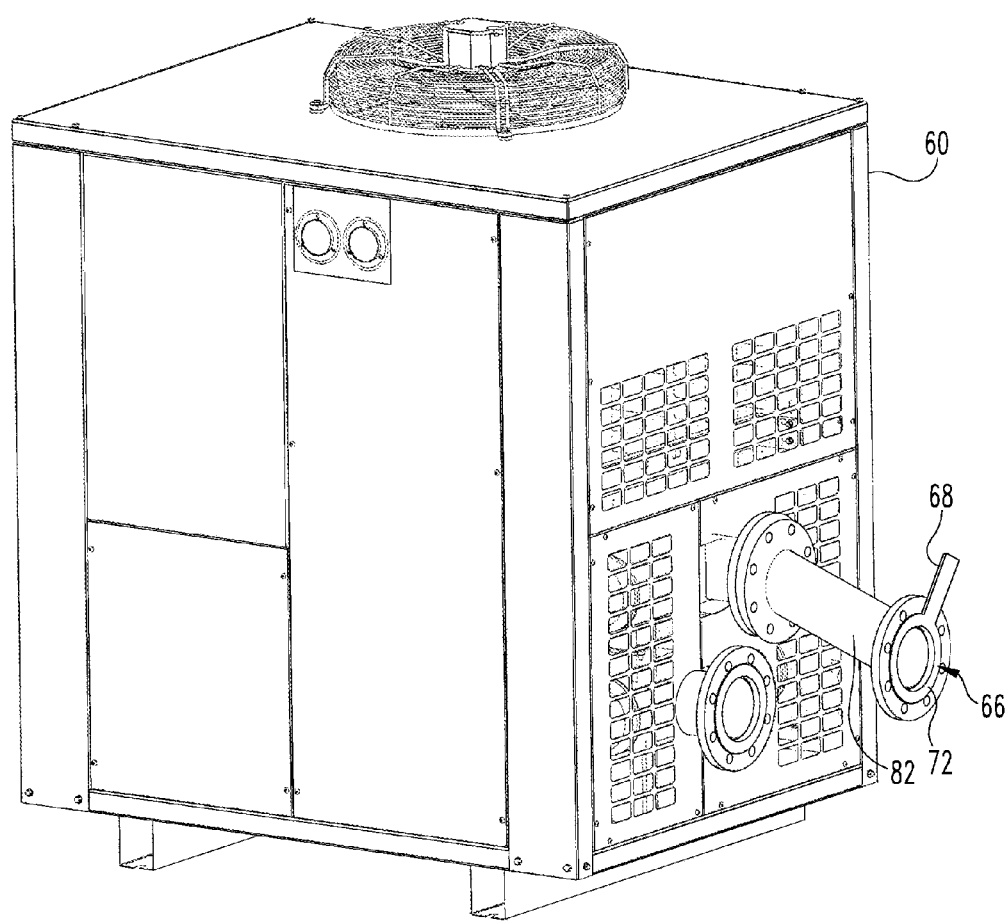
FIG. 4 depicts an air compressor filter used to filter air incoming to a refrigerated dryer.

Turning now to FIG. 4, one embodiment of a refrigerated dryer 60 is shown having an inlet conduit 82 for the conveyance of a compressible gas. The filter 66 is shown positioned within the conduit 82 in which the flange 72 and handle 68 are visible. The flange 72 can be fitted between flanges of adjacent conduit 82 and connected in place. Air flows into the refrigerated dryer 60 through the open end of the flange 72 of the frustoconical shaped filter 66, through the openings 80 in the mesh filter 76, and out the passages 78 in the retainer 74. Other configurations are also contemplated.

One aspect of the present application provide an apparatus comprising an air compressor filter having a conical shape, and including a retainer having a plurality of passages therethrough structured to permit compressible gas to pass between a first side of the retainer and a second side of the retainer, the retainer forming an outer surface of a frustum having an open interior within which is located a filter mesh having plurality of mesh passages formed therein, the frustum having a first narrow end attached to a first end cap and a second wide end attached to a second end cap, each of the plurality of passages of the retainer having a cross sectional area which is greater than one hundred orders of magnitude larger than a median cross sectional area of the plurality of mesh passages.

A feature of the present application includes a first end cap located and a second end cap, the first end cap.

Another feature of the present application includes wherein the first narrow end and the second wide end are sealed such that air is caused to pass solely through perforations in the perforated retainer and thereafter pass solely through passages in the filter mesh when the second wide end of the air compressor filter sealingly abuts an inside surface of a compressor conduit into which the air compressor filter is fitted.

Yet another feature of the present application includes wherein the filter mesh is a 5μ fine filter mesh, wherein the air compressor filter includes no other filtering media.

Still another feature of the present application further includes an elongate handle extending from a side of the air compressor filter, and wherein the filter mesh is a single layer mesh filter.

Yet still another feature of the present application further includes an oil-filled compressor having a conduit leading to the compressor, the conduit having a circular shaped passage extending from a first end to a second end, the compressor filter fitted inline with and internal to the conduit such that a narrow end of the frustum is pointed to the first end and the wide end of the frustum is pointed to the second end.

Still yet another feature of the present application includes wherein the air compressor filter includes no other filtering media, and wherein the air compressor filter further includes an elongate handle which projects from and end of the air compressor filter.

A further feature of the present application further includes a heat exchanger having heat exchange fins positioned downstream of the filter herein the filter is structured to capture solid particulate matter that would otherwise pose a hazard to the heat exchanger fins.

Another aspect of the present application includes an apparatus comprising a gas compressor system having conduit for the passage of compressible gas and a compressor component with a gas intake and a gas outlet where a mass flow of the compressible gas that flows from the gas intake through the compressor component and out the gas outlet also flows through a gas dryer structured to remove moisture from a compressed form of the compressible gas, the gas compressor system also including a frustoconical shaped filter assembly having a first narrow end of a frustoconical shape structured to pass filtered compressible gas and a second wide end of the frustoconical shape structured to receive unfiltered compressible gas, the frustoconical shaped filter assembly disposed in the conduit wherein the filter includes a retainer housing only a single frustoconical shaped filter media.

A feature of the present application includes wherein the single frustoconical shaped filter media is a mesh filter.

Another feature of the present application includes wherein the mesh filter includes passages having size of 5μ.

Still another feature of the present application includes wherein the retainer having a frustoconical shape and includes a plurality of openings substantially larger than a plurality of openings in the mesh filter.

Yet still another feature of the present application includes wherein the single frustoconical shaped filter media is disposed internal to a retainer, the retainer providing structural strength to the mesh filter and extending between the first narrow end and the second wide end.

Still yet another feature of the present application includes wherein the retainer includes a passage through which compressible gas flows that is greater than 1,000 times larger than a median passage of the mesh filter through which compressible gas flows.

A further feature of the present application includes wherein the frustoconical shaped filter assembly includes a handle projecting from one side structured to support the filter assembly upon removal from the conduit.

A still further feature of the present application includes wherein the conduit in which the frustoconical shaped filter assembly is disposed is a pipe spool segment that can be detached from a housing that encloses the compressor component, and wherein the retainer is frustoconical shaped.

Another aspect of the present application includes a method comprising servicing a filter of a compressor and compressor dryer system where the compressor is structured to compress a gas and the compressor dryer is structured to remove moisture from the gas, decoupling a pipe conduit to expose an end of a pipe spool segment, the exposed end of the pipe spool segment sufficient to access an inline filter, the inline filter having a frustoconical shape formed by a retainer and a single filter media, and removing the inline filter for servicing.

A feature of the present application includes wherein the removing further includes grasping a handle of the inline filter.

Another feature of the present application includes wherein the handle is an elongate handle that protrudes away from the inline filter, and wherein the retainer and the single filter media are frustoconical in shape.

Still another feature of the present application includes wherein the single filter media is a mesh screen, and wherein servicing the inline filter includes cleaning and replacing the filter.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a gas compressor system having conduit for the passage of compressible gas and a compressor component with a gas intake and a gas outlet where a mass flow of the compressible gas that flows from the gas intake through the compressor component and out the gas outlet also flows through a gas dryer structured to remove moisture from a compressed form of the compressible gas, the gas compressor system also including a frustoconical shaped filter assembly having a first narrow end of a frustoconical shape structured to pass filtered compressible gas and a second wide end of the frustoconical shape structured to receive unfiltered compressible gas, the frustoconical shaped filter assembly disposed in the conduit wherein the filter includes a retainer housing only a single frustoconical shaped filter media, and wherein the single frustoconical shaped filter media is a mesh filter and is disposed internal to a retainer, the retainer providing structural strength to the mesh filter and extending between the first narrow end and the second wide end.

2. The apparatus of claim 1, wherein the mesh filter includes passages having size of 5μ.

3. The apparatus of claim 1, wherein the retainer having a frustoconical shape and includes a plurality of openings substantially larger than a plurality of openings in the mesh filter.

4. The apparatus of claim 1, wherein the retainer includes a passage through which compressible gas flows that is greater than 1,000 times larger than a median passage of the mesh filter through which compressible gas flows.

5. The apparatus of claim 4, wherein the frustoconical shaped filter assembly includes a handle projecting from one side structured to support the filter assembly upon removal from the conduit.

6. The apparatus of claim 5, wherein the conduit in which the frustoconical shaped filter assembly is disposed is a pipe spool segment that can be detached from a housing that encloses the compressor component, and wherein the retainer is frustoconical shaped.

7. An apparatus comprising:
a gas compressor system having conduit for the passage of compressible gas and a compressor component with a gas intake and a gas outlet where a mass flow of the compressible gas that flows from the gas intake through the compressor component and out the gas outlet also flows through a gas dryer structured to remove moisture from a compressed form of the compressible gas, the gas compressor system also including a frustoconical shaped filter assembly having a first narrow end of a frustoconical shape structured to pass filtered compressible gas and a second wide end of the frustoconical shape structured to receive unfiltered compressible gas, the frustoconical shaped filter assembly disposed in the conduit wherein the filter includes a retainer housing only a single frustoconical shaped filter media, wherein the single frustoconical shaped filter media is a mesh filter and wherein the mesh filter includes passages having size of 5μ.

8. The apparatus of claim 7, wherein the retainer having a frustoconical shape and includes a plurality of openings substantially larger than a plurality of openings in the mesh filter.

9. The apparatus of claim 7, wherein the single frustoconical shaped filter media is disposed internal to a retainer, the retainer providing structural strength to the mesh filter and extending between the first narrow end and the second wide end.

10. The apparatus of claim 9, wherein the retainer includes a passage through which compressible gas flows that is greater than 1,000 times larger than a median passage of the mesh filter through which compressible gas flows.

11. The apparatus of claim 10, wherein the frustoconical shaped filter assembly includes a handle projecting from one side structured to support the filter assembly upon removal from the conduit.

12. The apparatus of claim 11, wherein the conduit in which the frustoconical shaped filter assembly is disposed is a pipe spool segment that can be detached from a housing that encloses the compressor component, and wherein the retainer is frustoconical shaped.

13. An apparatus comprising:
a gas compressor system having conduit for the passage of compressible gas and a compressor component with a gas intake and a gas outlet where a mass flow of the compressible gas that flows from the gas intake through the compressor component and out the gas outlet also flows through a gas dryer structured to remove moisture from a compressed form of the compressible gas, the gas compressor system also including a frustoconical shaped filter assembly having a first narrow end of a frustoconical shape structured to pass filtered compressible gas and a second wide end of the frustoconical shape structured to receive unfiltered compressible gas, the frustoconical shaped filter assembly disposed in the conduit wherein the filter includes a retainer housing only a single frustoconical shaped filter media, wherein the single frustoconical shaped filter media is a mesh filter, and wherein the retainer having a frustoconical shape and includes a plurality of openings substantially larger than a plurality of openings in the mesh filter.

14. The apparatus of claim 13, wherein the mesh filter includes passages having size of 5μ.

15. The apparatus of claim 13, wherein the single frustoconical shaped filter media is disposed internal to a retainer, the retainer providing structural strength to the mesh filter and extending between the first narrow end and the second wide end.

16. The apparatus of claim 15, wherein the retainer includes a passage through which compressible gas flows that is greater than 1,000 times larger than a median passage of the mesh filter through which compressible gas flows.

17. The apparatus of claim 16, wherein the frustoconical shaped filter assembly includes a handle projecting from one side structured to support the filter assembly upon removal from the conduit.

18. The apparatus of claim 17, wherein the conduit in which the frustoconical shaped filter assembly is disposed is a pipe spool segment that can be detached from a housing that encloses the compressor component, and wherein the retainer is frustoconical shaped.

* * * * *